(12) United States Patent
Miwa et al.

(10) Patent No.: US 9,489,393 B2
(45) Date of Patent: Nov. 8, 2016

(54) INFORMATION SYSTEM

(71) Applicant: Hitachi, Ltd., Tokyo (JP)

(72) Inventors: Shusaku Miwa, Tokyo (JP); Nobuyuki Saika, Tokyo (JP); Homare Kanie, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 14/426,786

(22) PCT Filed: May 14, 2014

(86) PCT No.: PCT/JP2014/062787
§ 371 (c)(1),
(2) Date: Mar. 9, 2015

(87) PCT Pub. No.: WO2015/173901
PCT Pub. Date: Nov. 19, 2015

(65) Prior Publication Data
US 2016/0259808 A1    Sep. 8, 2016

(51) Int. Cl.
G06F 17/30 (2006.01)
H04L 29/08 (2006.01)
G06F 15/16 (2006.01)

(52) U.S. Cl.
CPC ... G06F 17/30174 (2013.01); G06F 17/30203 (2013.01); H04L 67/06 (2013.01)

(58) Field of Classification Search
None
See application file for complete search history.

(56) References Cited

U.S. PATENT DOCUMENTS

2003/0208693 A1    11/2003  Yoshida
2004/0030832 A1 *  2/2004   Squibbs ............ G06F 12/0886
                                                      711/118
2004/0132467 A1 *  7/2004   Hull .................. H04W 4/02
                                                      455/458
2013/0097284 A1    4/2013   Bai et al.
2013/0311514 A1    11/2013  Sunada et al.
2014/0019970 A1    1/2014   Okamoto

FOREIGN PATENT DOCUMENTS

| JP | 2003-006071 A | 1/2003 |
| JP | 2003-323365 A | 11/2003 |
| JP | 2011-070567 A | 4/2011 |
| JP | 2013-114271 | 6/2013 |
| JP | 2013-210816 | 10/2013 |
| JP | 2013-539089 A | 10/2013 |
| WO | WO 2012/132808 A1 | 10/2012 |
| WO | WO 2013/171802 A1 | 11/2013 |
| WO | WO 2014/068749 A1 | 5/2014 |

OTHER PUBLICATIONS

PCT International Search Report and Written Opinion on application PCT/JP2014/062787 mailed Aug. 12, 2014; 10 pages.
PCT International Search Report on application PCT/JP2014/062787 mailed Aug. 12, 2014; 3 pages.

* cited by examiner

Primary Examiner — Alex Gofman
(74) Attorney, Agent, or Firm — Foley & Lardner LLP

(57) ABSTRACT

The information system of the present invention is composed of multiple sites including a local file server and clients, and a data center having a center file server. When a user starts moving to a different site after using a file in the local file server through a client of any one site, the local file server replicates files of a user having the shortest predicted arrival site to a different site to a center file server preferentially based on a location information of each user. Further, at each site, files of a user having a short predicted time of arrival to its own site are downloaded based on the location information of the user.

7 Claims, 11 Drawing Sheets

Fig. 6

EDGE LOCATION INFORMATION TABLE 300 (410)

| SITE NAME | LONGITUDE | LATITUDE |
|---|---|---|
| SITE A | E139°38 | N35°26 |
| SITE B | E140°31 | N34°23 |
| SITE C | E138°33 | N32°15 |
| : | : | : |

LOCATION INFORMATION TRANSITION RETENTION TABLE 400

| USER ID | REGISTRATION TIME | LONGITUDE | LATITUDE |
|---|---|---|---|
| User001 | 2014/1/1 00:00:00 | E139° 38 | N35° 26 |
| : | : | : | : |
| USER ID | REGISTRATION TIME | LONGITUDE | LATITUDE |
| User002 | 2014/1/1 00:10:05 | E140° 31 | N34° 23 |
| : | : | : | : |

LOGIN DATE AND TIME TABLE 310

| USER ID | LOGIN DATE AND TIME |
|---|---|
| User001 | 2014/1/1 00:00:00 |
| User002 | 2014/1/3 00:00:00 |
| User003 | : |
| : | : |

LOGOFF DATE AND TIME TABLE 320

| USER ID | LOGOFF DATE AND TIME |
|---|---|
| User001 | 2014/1/1 00:00:00 |
| User002 | 2014/1/3 00:00:00 |
| User003 | : |
| : | : |

Fig. 9

APPROACH DETERMINATION HISTORY TABLE 330

| USER ID | APPROACH DATE AND TIME | LOGIN FLAG |
|---|---|---|
| User001 | 2014/1/1 00:00:00 | 1 |
| User001 | 2014/2/3 22:00:00 | 0 |
| User002 | 2014/1/3 00:00:00 | 1 |
| User003 | : | -1 |
| : | : | : |

Fig. 10

LOGIN PROBABILITY TABLE 340

| USER ID | LOGIN PROBABILITY |
|---|---|
| User001 | 25% |
| User002 | 5% |
| User003 | 85% |
| User004 | : |
| : | : |

Fig. 11

FILE USE HISTORY TABLE 350

| USER ID | ACCESS DATE AND TIME | FILE PATH | SIZE |
|---|---|---|---|
| User001 | 2014/2/1 00:00:00 | /home/user001/a.txt | 100 |
| User002 | 2014/2/2 15:00:00 | /home/user002/b.txt | 200 |
| User001 | 2014/2/4 00:00:00 | /home/user001/c.txt | 300 |
| : | : | : | : |

REPLICATION TARGET LIST

INFORMATION SYSTEM

TECHNICAL FIELD

The present invention relates to an information system including a file server connected to a communication network.

BACKGROUND ART

In the prior art, when accessing files of a user stored in a file server, it was common to access the files from a client computer located at a site where the file server is located. Recently, however, along with the spreading of the Internet, a form of use of the data in the file server from remote locations via the Internet is increasing.

When accessing a file server from a remote location via the Internet, the user wishing to access the file in the file server must access the file server via the Internet, which is a network where throughput is not guaranteed. Therefore, this method has a drawback in that the response time of a user accessing a file may be elongated depending on the state of the network.

In order to solve the above-mentioned problems, Patent Literature 1 discloses an art of a data delivery system composed of multiple file servers mutually connected via a network and a data management center, wherein the file that a user uses is automatically delivered to a file server located close to the user out of the multiple file servers, following the movement of the user. According to the data delivery system disclosed in Patent Literature 1, the data management center acquires location information from a location information terminal possessed by the user, and based on the acquired location information, delivers the data to the file server located closest to the user. This technique has a merit in that the user can instantly use the file he/she wishes to use.

CITATION LIST

Patent Literature

[PTL 1] Japanese Patent Application Laid-Open Publication No. 2003-006071

SUMMARY OF INVENTION

Technical Problem

According to the system disclosed in Patent Literature 1, transfer of files occurs between file servers, along with the movement of the user. In an environment where there are a large number of users using the data delivery system and the respective users frequently move from one site to another, the amount of data transfer becomes excessive.

If there is a large amount of transfer target data, the amount of data that can be transferred per unit time is limited, so that there is a need to determine the priorities of the transfer target files. One of the simplest methods for determining the priority can be, for example, transferring the files in order starting from the files of the user who first started to move to a different site.

However, since the speed of movement and the distance of movement of the respective users differ, it may be possible that the second or later user having started to move to a different site arrives at the destination site faster than the user having started to move to a different site first, and starts to use the file at the destination site. In that case, if the transfer of files of the user having started to move to a different site first is prioritized, the transfer of files of the second or later user moving to a different site may be delayed, and a case may occur where files will not reach the migration destination site until the second user moving to a different site starts accessing the files at the destination site. In that case, a problem occurs in that the user cannot refer to the files until the files are delivered to the destination site.

Therefore, the present invention aims at providing a technique for appropriately controlling the order of delivery of files.

Solution to Problem

An information system according to one aspect of the present invention is composed of multiple sites having a local file server and a client, and a data center having a center file server. After the user uses the file in the local file server using a client at any one site, when the user starts moving to a different site, the local file server replicates the files of a user having the shortest predicted arrival time to a different site preferentially to the center file server. In addition, at each site, download of a file of the user having a short predicted arrival time to its own site is performed based on the location information of the user.

Moreover, in the information system according to one aspect of the present invention, the local file server at each site determines the amount of download of files of the respective users based on the probability of a user logging in to the local file server of its site.

Advantageous Effects of Invention

According to the present invention, a file updated at a file server at a certain site can be appropriately stored to a file server at a destination site, accompanying the movement of the user from one site to another.

BRIEF DESCRIPTION OF DRAWINGS

FIG. 6 is a view illustrating a configuration of an Edge location information table.

FIG. 7 is a view illustrating a configuration of a location information transition retention table.

FIG. 8 is a view illustrating a configuration of a login date and time table and a logoff date and time table.

FIG. 9 is a view illustrating a configuration of an approach determination history table.

FIG. 10 is a view illustrating a configuration of a login probability table.

FIG. 11 is a view illustrating a configuration of a file use history table.

DESCRIPTION OF EMBODIMENTS

Figure 1:
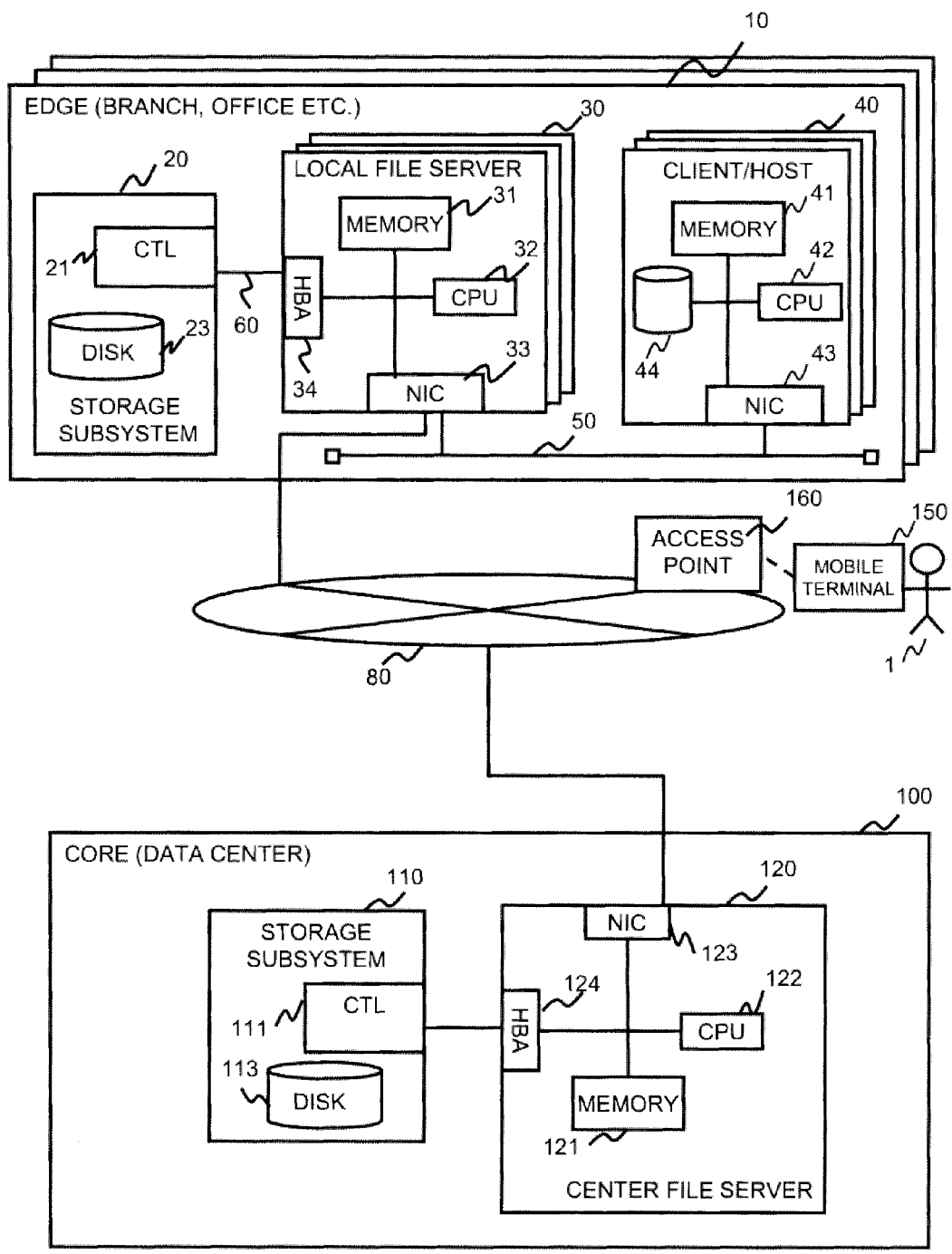
FIG. 1 is a hardware configuration diagram of an information system according to a preferred embodiment of the present invention.

Now, the preferred embodiments of the present invention will be described with reference to the drawings.

We will describe some embodiments of the present invention with reference to the drawings. The preferred embodiments illustrated below are not intended to restrict the scope of the invention described in the claims, and not all the elements or the combination of elements described in the description are indispensable for realizing the present invention.

In the following description, the information of the present invention may be referred to as "aaa table" and the like, but these information can also be represented by data structures other than tables. Therefore, an "aaa table" may be referred to as "aaa information" to show that the information does not depend on the data structure. Further, the information for identifying "bbb" of the present invention may be referred to as "bbb name" and the like, but the information for identifying the information is not restricted to names, and any information such as identifiers, identification numbers and addresses can be used, as long as the information can specify "bbb".

The processes are sometimes described using the term "program" as the subject, but since a program is executed by a processor (typically a CPU (Central Processing Unit)) performing processes using a memory and an I/F (interface), the processes can be described using the term processor as the subject. Further, the processes described using the term program as the subject can also be considered as a process executed by a file server (such as a local file server or a center file server described later). A portion or all of the programs can be realized by a dedicated hardware. Even further, the various programs can be installed to each computer from a program distribution server or a computer-readable storage media. The storage media can be, for example, IC cards, SD cards, DVDs, and so on.

Now, we will describe the various terms used in the preferred embodiments described hereafter. A "Core" is a site (consolidation site) including a remote computer system, and for example, it can be a site for collectively managing a server and a storage subsystem, or a site providing a cloud service. An "Edge" is a site including a local computer system, and for example, it is a site where a user performs actual business, such as a branch office, a sales office, a remote office and so on. A "stub" is an object (metadata) to which a storage destination information (information showing the link destination) of a file is associated. "Stubbing" refers to a state where actual data (real data) of a file at the Edge (computer system at the Edge) is deleted, and only the management information is retained. Since a stubbed file does not retain real data, the real data must be acquired from the computer system at the Core when the file is accessed. Therefore, the performance of access to stubbed files is deteriorated compared to normal files.

"Replication" refers to copying (replicating) a file in the Edge to the Core. "Migration" refers to replicating the file in the Edge to the Core, and stubbing the file in the Edge. An "archive" is a collective term for migration and replication. A "recall" refers to acquiring real data from the Core regarding a stubbed file, and retaining the same in the file at the Edge. A "cache" refers to a file remaining in the Edge after a file has been replicated from the Edge to the Core, or such operation of retaining the file in the Edge. The access to the cache is performed via an equivalent access performance as a normal file. A "home directory" refers to a user-dedicated directory assigned to each user in a file server, and directories and files of the user are disposed thereunder. A "user file" is a file and/or a directory of a user stored under the home directory of the user.

A configuration of an information system according to a preferred embodiment of the present invention will be described below. FIG. 1 is a view illustrating a hardware configuration of an information system according to the present embodiment.

An information system according to the preferred embodiment of the present invention is arranged at a Core 100, which is a data center, and at multiple Edges 10, which are sites located at a different site from the data center. Edges 10 can be, for example, branch offices or places of business of enterprises, and the respective Edges 10 exist at geographically different locations. However, the present invention is effective regardless of the distance between Edges 10. For example, the first Edge and the second Edge can be placed at adjacent sites, such as a configuration where the first Edge and the second Edge are different buildings within the same site. It is also possible to adopt a configuration where the first Edge is in Japan and the second Edge is in the United States. In the example illustrated in FIG. 1, there is only a single Core 100, but a configuration having multiple Cores 100 can be adopted. The following description mainly describes a configuration example where there is only one Core 100.

At first, we will describe the configuration of a computer system installed at the Edge 10. The computer system at the Edge 10 has a storage subsystem 20, one or more local file servers 30, and one or more client (such as a personal computer)/host (such as a server) 40. The local file server 30 is an example of a locally disposed file server. The local file server 30 is connected via a communication network 5) (such as a LAN (Local Area Network)) to the client/host 40, for example. Further, the local file server 30 is connected via a communication network 60 (such as a SAN (Storage Area Network)) to the storage subsystem 20, for example.

The storage subsystem 20 has a storage controller (also abbreviated as CTL) 21, and a DISK 23. The storage controller 21 is a device having a communication interface connected to the local file server 30, and a processor for processing I/O requests to the DISK 23. The DISK 23 is a final storage device for storing the write data from the local file servers 30, which are storage devices such as HDDs (Hard Disk Drives) and SSDs (Solid State Drives). A configuration is illustrated in FIG. 1 where there is only one CTL 21 and one DISK 23 disposed, but the number can be two or more. One or more RAID groups can be composed of multiple DISKs 23.

The storage subsystem 20 receives a block-level I/O request transmitted from the local file servers 30 by the CTL 21, and executes an I/O to an appropriate DISK 23.

The local file server 30 has a memory 31, a CPU 32, an NIC (Network Interface Card) 33, and an HBA (Host Bus Adaptor) 34. The CPU 32 is connected to the memory 31, the NIC 33 and the HBA 34. The NIC 33 is a communication interface device for communicating with the center file server 120 and the client/host 40. The HBA 34 is a communication interface device for communicating with the storage subsystem 20.

The memory 31 is a storage area that the CPU 32 can directly read from or write to (such as a RAM (Random Access Memory) or a ROM (Read Only Memory)). In the local file server 30, a program for controlling the local file server 30 (such as an OS (Operating System)) is read into the memory 31, and the CPU 32 executes the program. The local file server 30 can have other types of storage resources in addition to, or instead of, the memory 31. The memory 31 is one example of a storage device.

The local file server 30 receives a file-level I/O request from the client/host 40 via the NIC 33. The local file server 30 converts the file-level I/O request to a block-level I/O request and transmits the same to the storage subsystem 20.

The client/host 40 has a memory 41, a CPU 42, an NIC 43, and a DISK 44. The client/host 40 can have other types of storage resources in addition to, or instead of, the memory 41 and/or the DISK 44. Further, HDD and SSD are used, for example, as the DISK 44. It is not necessary that the DISK 44 is incorporated in the client/host 40, and a configuration can be adopted where the DISK 44 is externally disposed, in other words, placed outside the client/host 40 and connected via an HBA and the like.

In the client/host 40, the program stored in the DISK 44 (program for controlling the client/host 40 (such as an OS)) can be read into the memory 41, and have the program executed by the CPU 42. Further, the client/host 40 can transmit a file-level I/O request to the local file server 30 via the NIC 43.

A user 1, who is the user of the information system according to the preferred embodiment of the present invention, can move to each Edge 10, and can use the client/host 40 at an arbitrary Edge 10. Further, the user 1 possesses a mobile terminal 150 when he/she visits each Edge 10. One example of the mobile terminal 150 is a cellular phone, which is a portable electronic device capable of performing wireless communication, which can communicate with the center file server 120 at the Core 100 via an access point 160 connected to a communication network 80. Further, the mobile terminal 150 has a memory and a processor for executing programs stored in the memory, like many computers, but they are not shown in the drawing.

The mobile terminal 150 has a function for acquiring location information, such as a GPS, and has a function to transmit the acquired location information to the center file server 120. In FIG. 1, a configuration is shown where the access point 160 is connected to the communication network 80, but the present invention is not restricted to this configuration. It is possible that the center file server 120 and the access point 160 are connected via a network other than the communication network 80. Further, in the drawing, only user 1 is illustrated, but specifically, multiple users utilize the information system. Each of the multiple users possesses the mobile terminal 150 having the function to acquire location information.

Next, we will describe the configuration of the computer system installed in the Core 100. The computer system in the Core 100 has a storage subsystem 110 and a center file server 120. The center file server 120 is an example of a remote file server. The storage subsystem 110 is connected to the center file server 120.

The storage subsystem 110 has a storage controller (referred to as CTL in the drawing) 111 and a DISK 113. In FIG. 1, the configuration of the storage subsystem 110 and the configuration of the storage subsystem 20 are the same. Therefore, the storage subsystem 110 also receives the block-level I/O request transmitted from the center file server 120 by the CTL 111, and executes I/O to an appropriate DISK 113. Even if the configuration of the storage subsystem 110 and the configuration of the storage subsystem 20 differ, the present invention is still effective.

The center file server 120 has a memory 121, a CPU 122, an NIC 123, and an HBA 124. A different type of storage resource can be provided instead of, or in addition to, the memory 121. In the center file server 120, a program controlling the center file server 120 (such as an OS) is read into the memory 121, and the program is executed by the CPU 122. Further, the center file server 120 communicates with the local file servers 30 via the NIC 123 and the communication network 80. The center file server 120 performs access in block units to the storage subsystem 110 via the HBA 124.

Figure 2:
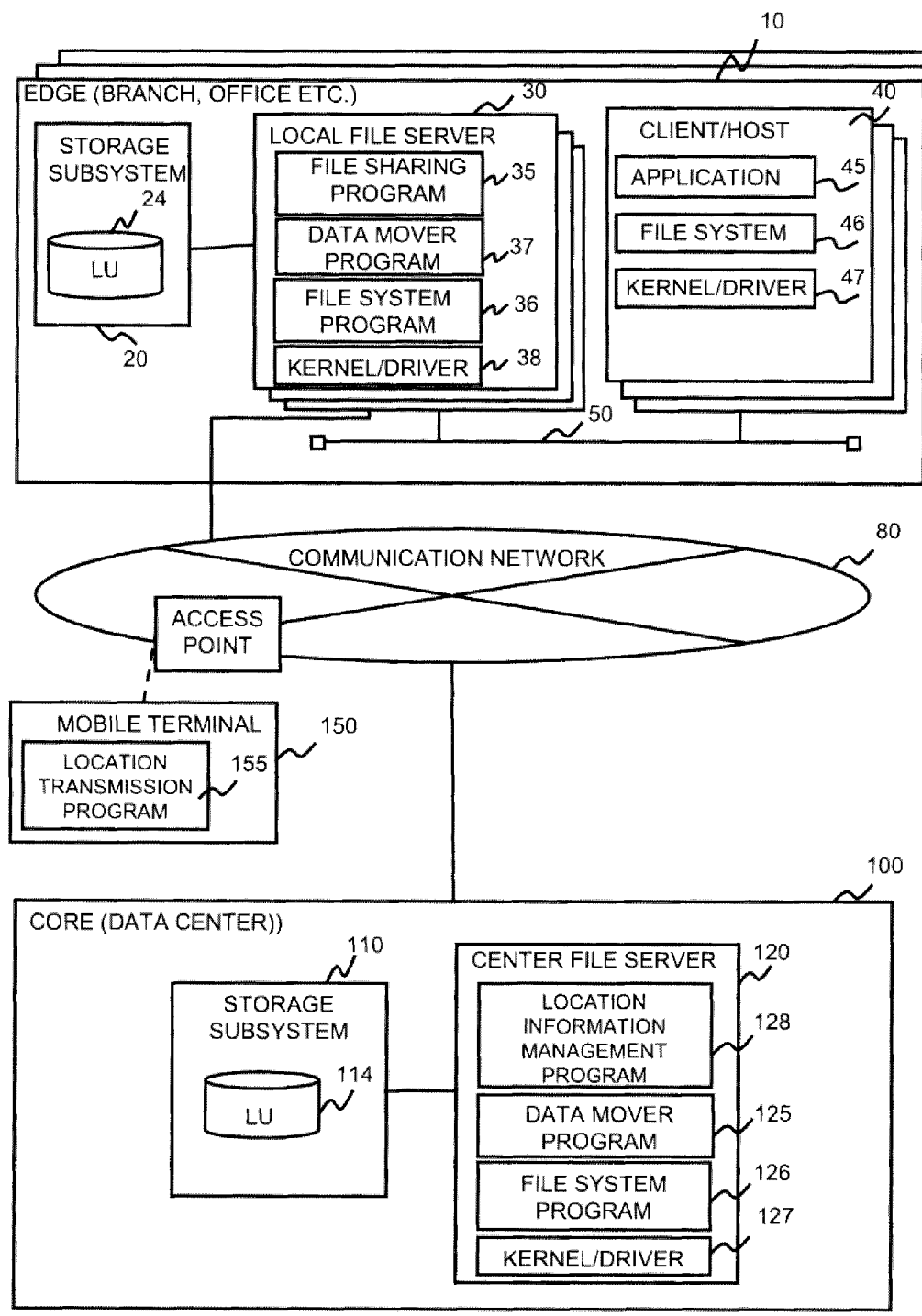
FIG. 2 is a software configuration diagram of an information system according to a preferred embodiment of the present invention.

FIG. 2 is a software configuration diagram of an information system according to the present embodiment.

In the storage subsystem 20 (110), a CTL 21 (111) uses a storage area of one or more DISKs 23 to form one or more LUs (Logical Units) 24 (114), and provides the same to the local file server 30 (center file server 120). The local file server 30 (center file server 120) stores a file to the LU 24 (114) provided by the storage subsystem 20 (110). Further, The OS used in the local file server 30 (center file server 120) and various programs can be stored in the LU 24 (114) provided by the storage subsystem 20 (110).

Next, we will describe the various programs executed by the local file servers 30 and the center file server 120. The memory 31 of the local file server 30 (memory 121 of the center file server 120) stores a data mover program 37 (125), a file system 36 (126), and a kernel/driver 38 (127). The memory 31 of the local file server 30 further stores a file sharing program 35. In the following, the data mover program 37 in the local file server 30 is called a "local mover", the data mover program 125 in the center file server 120 is called a "remote mover", and if they are not specifically distinguished, they are called a "data mover program". Files are communicated between the local file servers 30 and the center file server 120 via the local mover 37 and the remote mover 125.

The kernel/driver 38 (127) performs overall control and hardware-specific control, such as controlling the schedule of multiple programs (processes) operating in the local file server 30 (center file server 120) or interruption from the hardware.

The file system 36 (126) is a program for storing and managing files and file management information in the LU 24 (114), which is also referred to as file system program. The file management information includes various information related to the respective files and directories (such as information showing the size and location of the file). Regarding the file management information, the replication process and the contents of the management information required in a preliminary download process mainly described according to the present embodiment will be described later.

The file sharing program 35 is a program providing a file sharing service to the client/host 40 using a communication protocol such as CIFS (Common Internet File System) or NFS (Network File System). When the file sharing program 35 receives a file access request (such as a read request) from the client/host 40, it calls the local mover 37, reads the access target file from the LU 24, and returns the same to the client/host 40.

Figure 5:
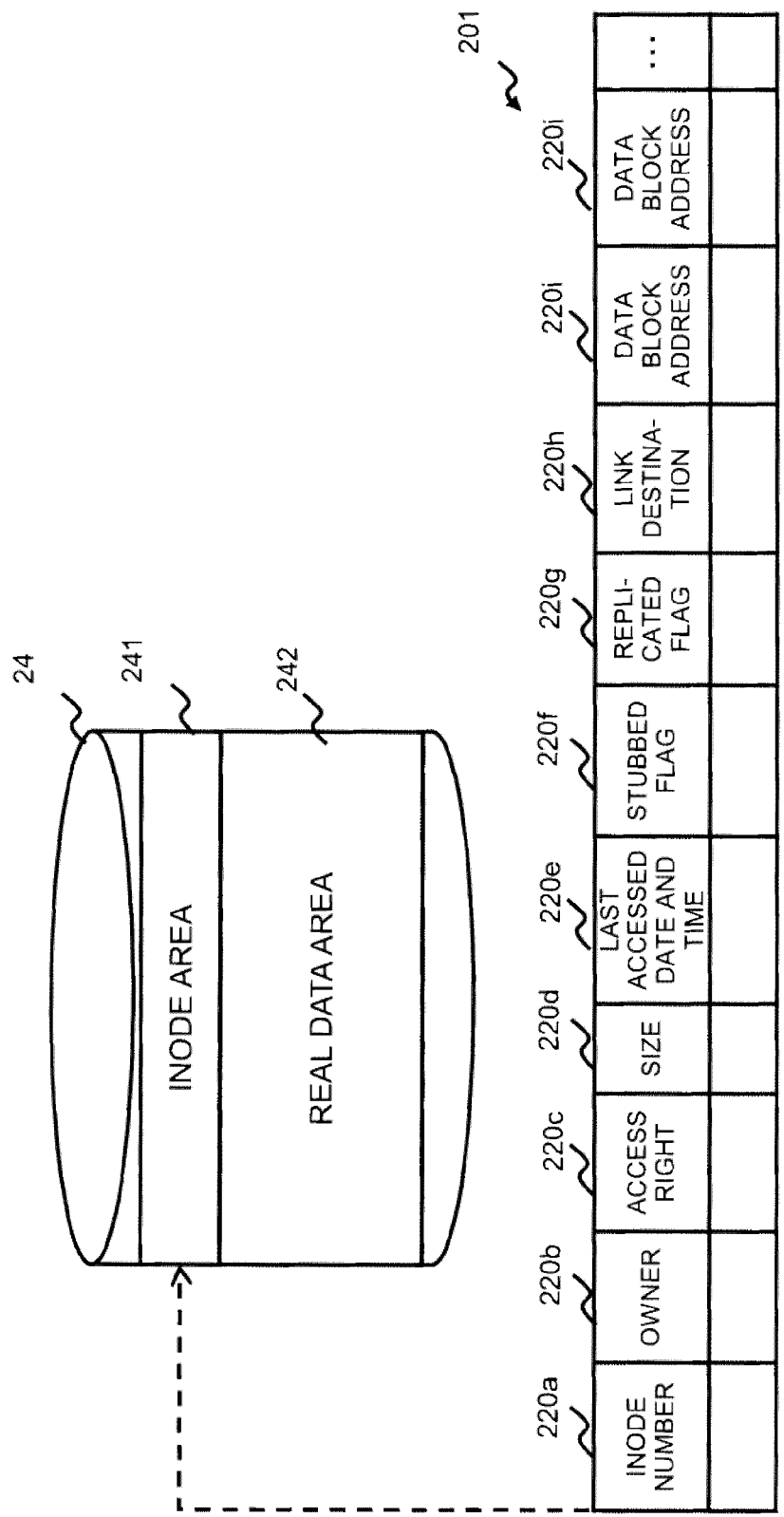
FIG. 5 is a view illustrating a configuration of an inode.

Before describing the local mover 37, we will first describe the file management information managed by the file system 3 (126). FIG. 5 is an explanatory view of a file management information managed by the local file server 30

(or the center file server 120) according to the preferred embodiment of the present invention.

An inode area 241 and a real data area 242 exist within the LU 24 used by the local file server 30 to store files. The inode area 241 stores an inode which is a management information of each file, and real data of a file is stored in the real data area 242.

We will describe the configuration of an inode 201 of a file stored in the inode area 241. Information other than information described below can also be stored in the inode, but here, we will only describe the information used in the replication process or the preliminary download process according to the present embodiment. The inode 201 has the following fields: an inode number 220*a*, an owner 220*b*, an access right 220*c*, a size 220*d*, a last accessed date and time 220*e*, a stubbed flag 220*f*, a replicated flag 220*g*, a link destination 220*h*, and data block addresses 220*i*.

In each inode in the inode area 241, a number called inode number which is unique within the inode area 241 is assigned, and this inode number is stored in the inode number 220*a*. A user ID of the owner of the file managed by this inode is stored in the owner 220*b*. An access rights information (whether read or write is enabled etc.) of the file managed by the inode is stored in the access right 220*c*. A size of the file managed by the inode is stored in the size 220*d*. A latest date and time information when the file managed by the inode has been accessed is stored in the last accessed date and time 220*e*. Multiple data block addresses 220*i* fields exist in an inode, each of which is used for storing the address of the area storing the real data of the file managed by the inode.

The stubbed flag 220*f*, the replicated flag 220*g* and the link destination 220*h* are fields used by the local mover 37 according to the embodiment of the present invention. The local mover 37 stores information in the stubbed flag 220*f* indicating whether the file managed by this inode is stubbed or not. When "0" is stored, it shows that the file is not stubbed, and when "1" is stored, it shows that the file is stubbed.

The local mover 37 stores information whether the file managed by this inode is already replicated in the center file server 120 or not in the replicated flag 220*g*. When "0" is stored, it shows that the file managed by this inode is not yet replicated in the center file server 120, and when "1" is stored, it shows that the file managed by this inode is already replicated in the center file server 120.

The file created or updated by the local file server 30 must be replicated to the center file server 120 at some timing. The replicated flag 220*g* is used for specifying the file required to be replicated. When a file is downloaded from the center file server 120 and stored in the LU 24, the local mover 37 sets the replicated flag 220*g* of the file to "1". When a file is updated by the client/host 40, or when a new file is created by the client/host 40, the local mover 37 sets the replicated flag 220*g* of the file to "0". Thereafter, in the replication process described later, the local mover 37 sets the file having the replicated flag 220*g* set to "0" as the replication target. When the file is replicated to the center file server 120, the local mover 37 sets the replicated flag 220*g* of the target file stored in the LU 24 to "1".

The link destination 220*h* stores information such as an URL (Uniform Resource Locator) showing the storage destination (link destination) in the core 100 of the real data of the file managed by this inode. The data mover program 125 of the center file server 120 stores the information on the storage location within the center file server 120 to the link destination 220*h*. When the center file server 120 transfers a file in response to the request from the local file server 30, the file management information including the link destination 220*h* is also transferred to the local file server 30. Further, when the file transferred from the local file server 30 by the replication process is stored in the LU 114 in the center file server 120, the information on the storage location (information corresponding to the link destination 220*h*) is transmitted from the center file server 120 to the local file server 30. The local file server stores the transmitted information of the storage location to the link destination 220*h*.

We will return to the description of the program in the local file server 30 and the center file server 120. The local mover 37 is a program which operates by being called by the file sharing program 35. When the local mover 37 is called by the file sharing program 35, it uses a file system 36 to execute reading and writing of the access target files. Further, the local mover 37 is a program that also executes replication, stubbing, and preliminary download processes.

When the local mover 37 executes a replication process, it reads the replication target file (the inode and the real data of the file pointed by the data block addresses 220*i* of the inode), and transfers the read file to the center file server 120. The remote mover 125 writes the file transferred from the local mover 37 (replication target file) to the LU 114 of the storage subsystem 110 using a file system 126.

Further, when a given condition is satisfied, the local mover 37 deletes the replicated file (strictly speaking, the real data of the file) in the LU 24, and only stores a stub (metadata) of the file whose real data has been deleted in the LU 24 (performs a so-called stubbing process). Thereby, a substantial migration of the replicated file is realized. Specifically, "1" is stored in the stubbed flag 220*f* of the file being stubbed, and the value of the data block addresses 220*i* are set to NULL. Thereafter, when a read request is received from the client/host 40 to the file having the real data deleted, the local mover 37 refers to the stub (file management information, in other words, inode) to acquire the real data of the file linked to the stub via the remote mover 125, and transmits the acquired file to the client/host 40. In the present embodiment, a "stub" is an object (metadata) to which the storage destination information (information showing the link destination; in the present embodiment, the link destination 220*h* included in the inode corresponds to this information) of a file is mapped. By the operation of the local mover 37, even if the file stored in the LU 24 is a stub without real data, the client/host 40 will not recognize such state.

Next, we will describe the various programs stored in the memory 41 of the client/host 40. The memory 41 of the client/host 40 stores an application 45, a file system 46 and a kernel/driver 47.

The application 45 is a software (application program) that the client/host 40 uses according to the object of operation. The kernel/driver 47 is similar to the above-described file system 36 (126) and the kernel/driver 38 (127).

The file system 46 is a program that processes file access requests from the application 45 and the like. When the file system 46 receives a file access request from the application 45 and the like, when the access target file is a file in the DISK 44, it performs a process to access the file stored in the DISK 44. On the other hand, if the access target file is a file managed by the local file server 30, the file system communicates with the file sharing program 35 using a protocol such as CIFS or NFS, to perform accesses to the file managed by the local file server 30.

Next, we will describe the programs executed in the center file server 120 and the mobile terminal 150. A location information management program 128 of the center file server 120 receives a location information from the mobile terminal 150 held by the user, and stores the same in a location information transition retention table 400 (described later). On the other hand, a location transmission program 155 is stored in the memory of the mobile terminal 150, which periodically acquires a location information (longitude, latitude information and the like) of the mobile terminal 150, and sends the location information together with user information of the user 1 (mentioned later) to the center file server 120.

Figure 3:
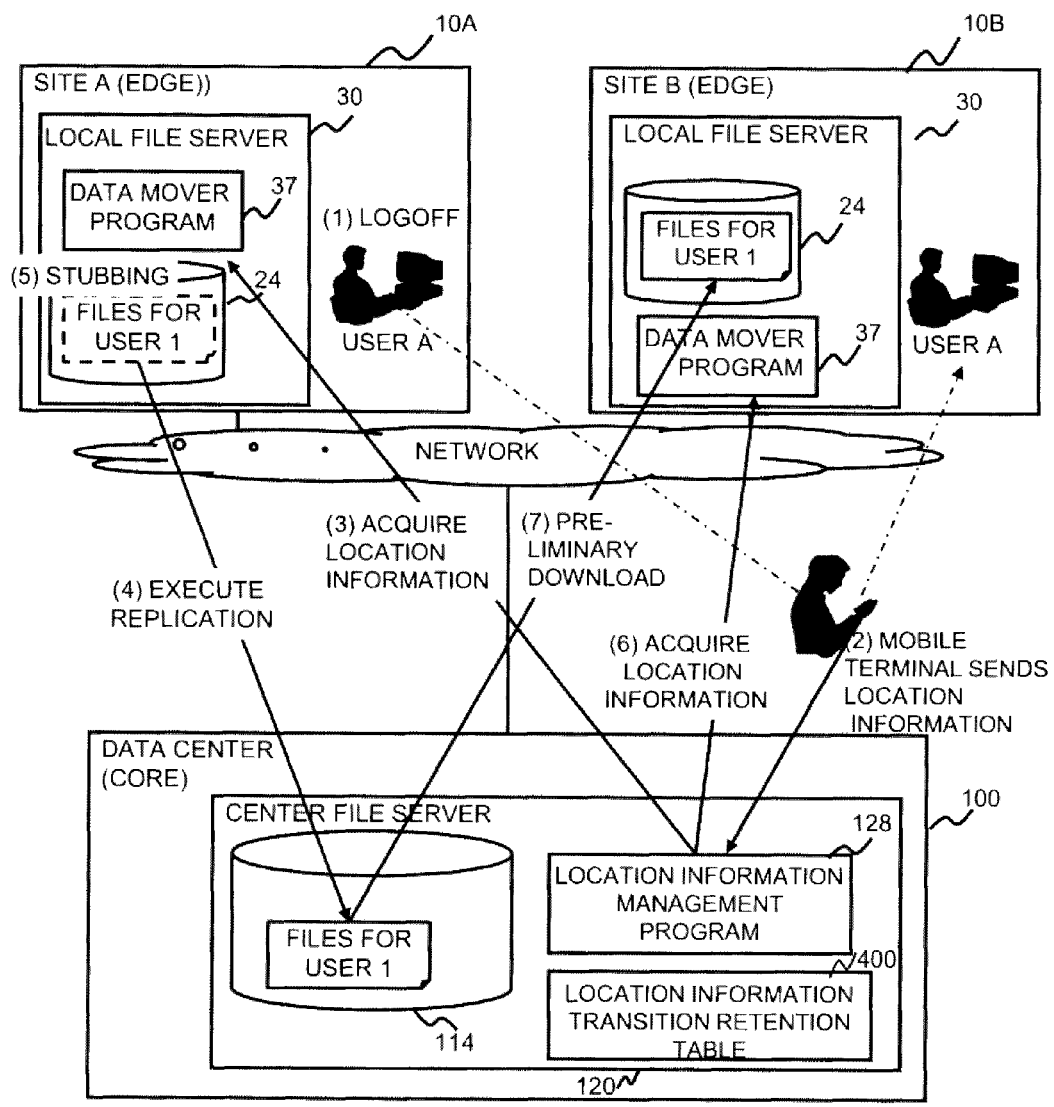
FIG. 3 is a view illustrating the outline of a process performed in an information system according to a preferred embodiment of the present invention.

Next, we will describe the outline of a file replication process and a preliminary download process performed by the information system according to the embodiments of the present invention with reference to FIG. 3. The center file server 120 stores and manages the files of all users using the information system according to the embodiment of the present invention. The user accesses a file stored in the local file server 30 through the client/host 40 at each site. Not all the files managed by the center file server 120 are stored in the local file servers 30, and when the user uses a file or before the user uses the file, the file is downloaded from the center file server 120. The user either refers to or updates the file downloaded to the local file server 30, and as for an update file, the file is replicated to the center file server 120.

We will assume, as an initial state (called state 0), a state that a certain user (user A) logs in to the client/host 40 at site A (Edge 10A), further uses the client/host 40 to log in to the local file server 30, and accesses a file provided by the local file server 30. In state 0, the one or multiple files that user A uses are stored in the LU 24 at Edge 10A. The files of user A also exist in the LU 114 at the Core 100, but if the user A updates the files at Edge 10A, the files of user A stored in the LU 114 at the Core 100 will become old files that are older than the files existing at Edge 10A (files not yet reflecting the contents of update to the files performed at Edge 10A).

Thereafter, the user A logs off from the client/host 40 and the local file server 30 to move to a different site (site B (Edge 10B)). The state at the point of time when the logoff process has been performed is called "state 1". Thereafter, the user starts moving toward site B.

The mobile terminal 150 that user A possesses continues to transmit location information periodically to the center file server 120. Even when the user A is in midway of moving from site A to site B (called state 2), the location information is transmitted.

The local file server 30 at site A replicates the files updated at site A to the center file server 120, but at that time, it determines the priority of the files subjected to replication based on the location information of each user. The local file server 30 periodically acquires the location information of user A and other users from the center file server 120 ((3) in the drawing). The local file server 30 determines the order of replication based on the acquired location information. The details of the method for determining the priority will be described later, but the replication is performed preferentially from files of the user having a shorter predicted time to arrive at another site, among the respective users ((4) in the drawing). Thereafter, the local file server 30 of site A performs stubbing of the files having been replicated. When the predicted time to arrive at another site is shorter, it is considered that the time for starting file access at the destination site is earlier. Therefore, in the method for determining the order of replication according to the embodiment of the present invention, replication is performed in order from the files of the user having an earlier time of starting file access at the destination site, so that it becomes possible to prevent a case where the file updated at site A cannot be accessed at the destination site.

On the other hand, a local server 30 at site B (Edge 10B), which is the destination of movement of user A, also acquires the location information periodically ((6) in the drawing). In the local file server 30 at site B (Edge 10B), based on the location information acquired at this time, a file to be downloaded (recalled) to the LU 24 at site B (Edge 10B) from the Core 100 is selected. The selected file is determined so that a file of a user having a high possibility of arriving at site B soon and logging in to the local file server 30 is selected preferentially ((7) in the drawing). Thereafter, user A arrives at site B, and at the point of time when the user logs in to the client/host 40 and the local file server 30 at site B, the file used by user A will be in a state downloaded to the local file server 30 at site B, so that when the user A accesses the file, the local file server 30 at site B will not need to download (recall) the file from the center file server 120.

In the above description, an example is illustrated where the local file server 30 at site A performs replication and stubbing, and the local file server 30 at site B performs download (recall) of the file, but it is possible that the user A moves from site B to site A. In that case, the local file server 30 at site B performs replication and stubbing, and the local file server 30 at site A performs download (recall) of the file. Therefore, the local file servers 30 at both sites have both the program for performing replication and stubbing based on the location information and the program for performing download (recall) of the file based on the location information. Further, according to the information system of the present embodiment, both the program for performing replication and stubbing based on the location information and the program for performing download (recall) of the file based on the location information are included in the data mover program 37 of the local file servers 30.

Figure 4:
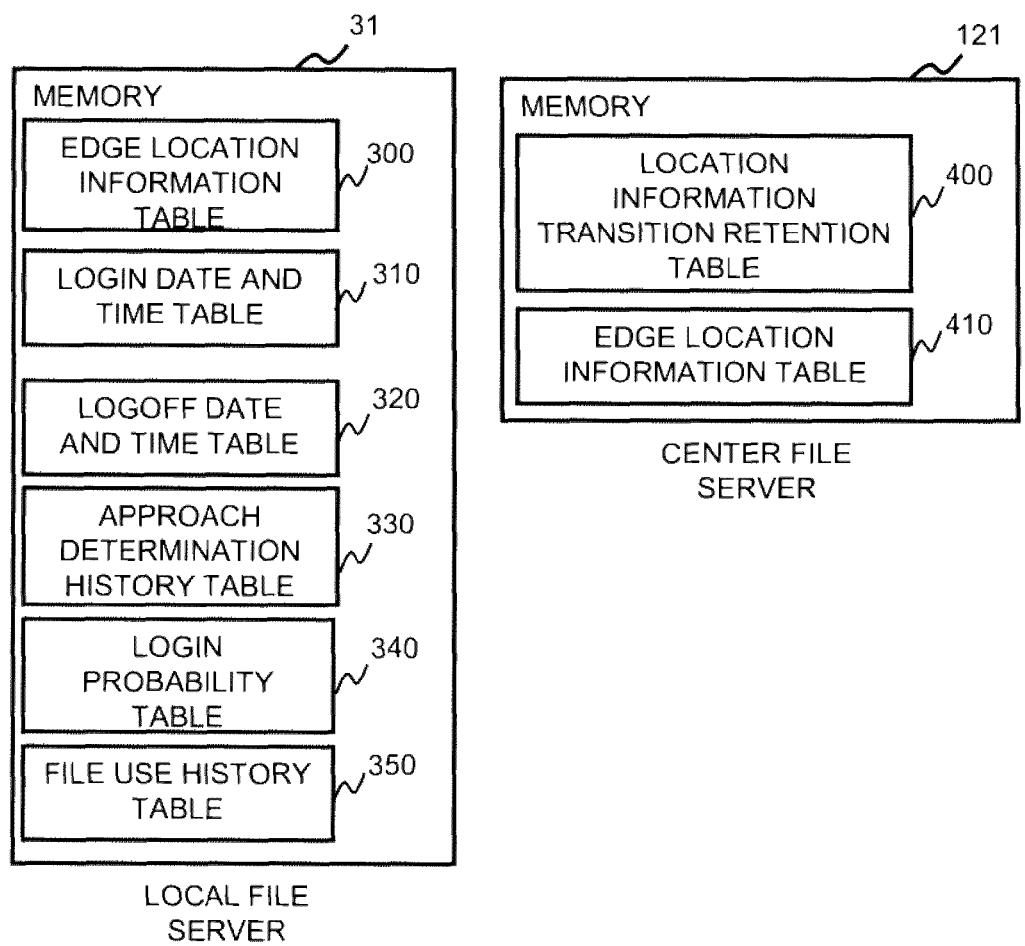
FIG. 4 is a view illustrating various management information stored in a memory of a local file server and a center file server.

Next, the various management information used by the local file server 30 and the center file server 120 in order to perform replication and stubbing based on location information and perform file download (recall) based on location information will be described with reference to FIG. 4. The local file server 30 has within the memory 31 an Edge location information table 300, a login date and time table 310, a logoff date and time table 320, an approach determination history table 330, a login probability table 340, and a file use history table 350. Further, the center file server 120 has in the memory 121 a location information transition retention table 400, and an Edge location information table 410.

The contents of an Edge location information table 300 (410) will be described with reference to FIG. 6. The Edge location information table 300 (410) is a table storing the geographical location information of each site, and stores a longitude 302 and a latitude 303 of the respective sites 301. The same information is stored in the Edge location information tables 300 in the local file servers 30 at the respective sites. Also, an Edge location information table 410 storing the same contents exists in the center file server 120 (on the other hand, the tables other than the Edge location information table 300 (41.0), which are the login date and time table 310, the logoff date and time table 320, the approach determination history table 330, the login probability table 340, and the file use history table 350, are information independently managed by the respective local file servers 30).

The contents of the login date and time table 310 and the logoff date and time table 320 will be described with reference to FIG. 8. The login date and time table 310 is a table for storing the date and time of login (login date and time 312) of the user 1 to the local file server 30 using the client/host 40 associated with a user ID (311) which is the identification information of the user. On the other hand, the logoff date and time table 320 is a table for storing the date and time of logoff of the user 1 using the client/host 40 from the local file server 30 (the logoff date and time 322) associated with a user ID (321) which is the identification information of the user. When the user logs in to the local file server 30 using the client/host. 40, the file sharing program 35 stores the user ID (311) and the login date and time 3121 in the login date and time table. On the other hand, when the user logs off from the server, the file sharing program 35 records the user ID (321) and the login date and time 322 in the logoff date and time table 320. Multiple login date and time information 312 and multiple logoff date and time information 322 can be stored per each user to the login date and time table 310 and the logoff date and time table 320.

Next, the contents of a location information transition retention table 400 will be described with reference to FIG. 7. The location information transition retention table 400 is a table for storing the result of reception of location information from (the location transmission program 155 of) the portable terminal by the location information management program 128 of the center file server 120. User information (user ID) and information on the longitude and latitude as location information are transmitted from the location transmission program 155. When the location information management program 128 receives this information, it stores the user ID transmitted from the location transmission program 155 in a user ID 401 field, and stores the longitude and the latitude in a longitude field 403 and a latitude field 404, respectively. The time when the user ID 401, the longitude 403 and the latitude 404 have been stored in the location information transition retention table 400, or the time when the user ID and location information have been received from the location transmission program 155 are stored in a registered time 402. Time information acquired from a clock in the center file server 120 is used as the time to be stored in the location information transition retention table 400. However, as another embodiment, it is possible to have the location transmission program 155 of the mobile terminal 150 transmit a time information together with the user ID and the location information, and to have the transmitted time stored in the location information transition retention table 400.

We will now provide a supplemental explanation on the user ID 401 used in the information system according to the present invention. The user IDs assigned to a single user may differ in each computer, depending on the computer system (for example, the user ID allocated to a user named "hirano" is "40" the client/host 40 at site A, but may be "3521" in the client/host 40 at site B). However, according to the information system of the present embodiment, the user ID allocated to a single user in the respective client/host 40, the local file servers 30 and the center file server 120 is all a common (same) II). Therefore, the user ID of user "hirano" is a common ID (such as "40") in the client/host 40 or local file server 30 at any Edge.

The same applies for the mobile terminal 150 possessed by the user "hirano". Therefore, the location transmission program 155 of the mobile terminal 150 possessed by user "hirano" is designed to transmit a common ID (such as "40") when it transmits the location information and user ID to the center file server 120.

However, as another embodiment, a means can be provided to manage a correspondence table in the center file server 120 between the user ID allocated to user "hirano" transmitted from the mobile terminal 150 and the user ID allocated to user "hirano" in the center file server 120 and the local file servers 30, and to provide a means enabling the user ID allocated to user "hirano" transmitted from the mobile terminal 15) to be converted to the user ID allocated to user "hirano" in the center file server 120 and the local file servers 30. Thus, the present invention can be implemented even in a case where the user IDs assigned to a single user differs between the mobile terminal 150 and the other servers (such as the local file servers 30 and the center file server 120).

The location transmission program 155 periodically transmits the location information, so that the location information transition retention table 400 is designed to store multiple information (a set of registered time 402, longitude 403 and latitude 404) per user. Therefore, the speed of movement and vector of movement (direction of movement and the like) of the user can be calculated based on the multiple location information and registered time of a certain user registered in the location information transition retention table 400. Moreover, by using the location information of the respective Edges registered in the Edge location information table 300 and the (multiple) location information of the user, it becomes possible to compute the distance from the location of each user to the respective Edges and the rate of change of distances. By referring to the rate of change of distances, it becomes possible to determine whether each user is approaching each Edge or moving away therefrom.

Next, the contents of the approach determination history table 330 will be described with reference to FIG. 9. When it is determined that a user has approached a site (Edge), the approach determination history table 330 is used to store user information and the time information thereof. The following fields exist in the approach determination history table 330; a user ID 331, an approach date and time 332, and a login flag 333. When a local file server 30 at a certain site (temporarily determined as Edge A) determines that a user (temporarily, the user ID thereof is determined as "User 001) has approached its own site (Edge A) (specifically, when the distance calculated based on the latest location information of the user (User 001) acquired from the center file server 120 and the location information of Edge A is less than a given threshold), it stores "User001" in the user ID 331 and the current time (time when the user has been determined to have approached this site) in the approach date and time 332. Other methods can be adopted as the method for determining that the user has approached its own site. For example, it is possible to calculate an predicted arrival time in which the respective users reach its own site based on the distance from its own site to the respective users and the speed of movement of the respective users, and determines that a user has approached its own site if the predicted time is equal to or smaller than a given threshold. It is also possible to use both methods.

Value selected from "−1", "0" or "1" is stored in the login flag 333 of the approach determination history table 330, and the initial value thereof is "−1". Therefore, at the point of time when a value is stored in the user ID 331 and the approach date and time 332, a value "−1" is stored in the login flag 333. The local file server 30 refers to the login date and time table 310 sometime after a value has been stored in the user ID 331 and the approach date and time 332, and determines whether there is a fact that a user specified by the user ID 331 has logged in to the local file server 30 within a given time from the approach date and time 332. If there is a fact that the user specified by the user ID 331 logged in to the local file server 30, "1" is stored in the login flag 333. If there was no login within the given time, "0" is stored in the login flag 333.

Multiple information (a set of the approach date and time 332 and the login flag 333) can be stored per user in the approach determination history table 330. However, since it is not possible to limitlessly store information of a single user, N number (N>1) of information is enabled to be stored per one user, and when information exceeding N is to be stored, the oldest information (the information having the oldest approach date and time 332) is deleted.

FIG. 10 shows the contents of the login probability table 340. According to the present embodiment, the value calculated by the following expression is called a "login probability":

(the number of times of login to the local file server of a user when he/she was determined to be approaching a certain site)/(number of times the user has been determined to have approached a site).

The login probability 342 is stored per user ID 341 in the login probability table 340. The local file server 30 refers to the approach determination history table 330, computes the login probability per user (user specified by the user ID 331), and stores the calculated value in the login probability 342.

An example of a case where the login probability of a user having User 001 as a user ID will be described. At first, the number of rows where the user ID 331 is "User001" in the approach determination history table 330 are counted (this value is temporarily referred to as A). Thereafter, out of the rows where the user ID 331 is "User 001", the number of rows where the value of the login flag 333 is "1" is counted (this value is temporarily referred to as B). In this case, "B/A" will be the login probability of User 001. The timing at which the local file server 30 calculates the login probability can be the same timing as the timing of update of the contents of the approach determination history table 330, or the calculation can be done periodically at a regardless timing.

FIG. 11 shows the contents of the file use history table 350. The file use history table 350 is a table for storing the history of access by a user of the files provided by the file server 30, wherein the date and time that the user specified by the user ID 351 has accessed a file specified by a file path 353 is stored in an access date and time 352, and access data size is stored in the size 354.

Since the file use history table 350 is a table for storing history, there will be no information stored in the initial state. When the user accesses a file provided by the local file server 30, the file sharing program 35 stores information of the user ID 351, the access date and time 352, the file path 353 and the size 354. However, if the user re-accesses the same file, since history regarding the file is already stored in the file use history table 350, only the contents of the access date and time 352 and the size 354 of the access target file are updated.

Next, the flow of replication/stubbing process executed by the local mover 37 according to the present embodiment will be described with reference to FIG. 12. The replication/stubbing process is a process executed periodically by the local file server 30.

At first, the local mover 37 refers to the logoff date and time table 320 and the login date and time table 310, and collects the user ID of a user that has logged off within a given time from the current time and is not currently logged in (S301). In the following description, the user having logged off within a given time from the current time is called a "candidate user".

Thereafter, the local mover 37 requests the location information management program 128 of the center file server 120 to transmit the location information corresponding to the user ID collected in S301, and acquires the location information of the user from the location information management program 128 (S302). The request transmitted to the location information management program 128 includes the user ID collected in S301. When the location information management program 128 receives this request from the local mover 37, it refers to the location information transition retention table 400 based on the user ID included in the request, extracts all the rows having the user ID 401 equal to the user ID included in the request, and returns the set of information of the registered time 402, the longitude 403 and the latitude 404 of the extracted row to the local mover 37. In the following description, the information of the row in the location information transition retention table 400 returned from the location information management program 128 to the data mover in which the user ID 401 is equal to the user II) included in the request is called a location transition information. The information returned to the local mover 37 in S302 is not restricted to the above-described example. The user ID 401 can be included in the returned information. Further, it is not necessary to extract all the rows having the user ID 401 that is equal to the user ID contained in the request from the location information transition retention table 400. It is possible to extract N rows (N≥2) in order from the rows having a newer registered time 402 out of the rows having the user ID 401 equal to the user ID included in the request, and to return the information regarding the extracted row.

When the local mover 37 receives the location transition information from the location information management program 128, it performs a process to determine the priority of replication (S303). It refers to the location transition information and the Edge location information table 300, and selects the replication target file. The details will be described later with reference to FIG. 13, but as a result of executing S303, a replication target list storing a list of the replication target files is created.

When the process for determining the priority of replication is ended, the local mover 37 performs replication of a file according to the order of the file stored in the replication target list created in S303 (S304). Further, regarding the file subjected to replication, the replicated flag 220g is changed from "0" to "1". Thereafter, the local mover 37 performs stubbing of the file (S305). In stubbing a file, the local mover 37 refers to the metadata of the respective files, and performs stubbing of the file where the difference between the last accessed date and time 220e and the current date and time is equal to or greater than a given value out of the files where the replicated flag 220g is "1". As for the file having been stubbed, the stubbed flag 220f is set to "1".

When stubbing of the file is completed, the process is ended. Here, an example has been explained of the process where stubbing is performed after executing replication, but it is not necessary to perform stubbing after executing replication. The stubbing can be set to be executed periodically at an independent (asynchronous) timing as the replication process.

Figure 13:
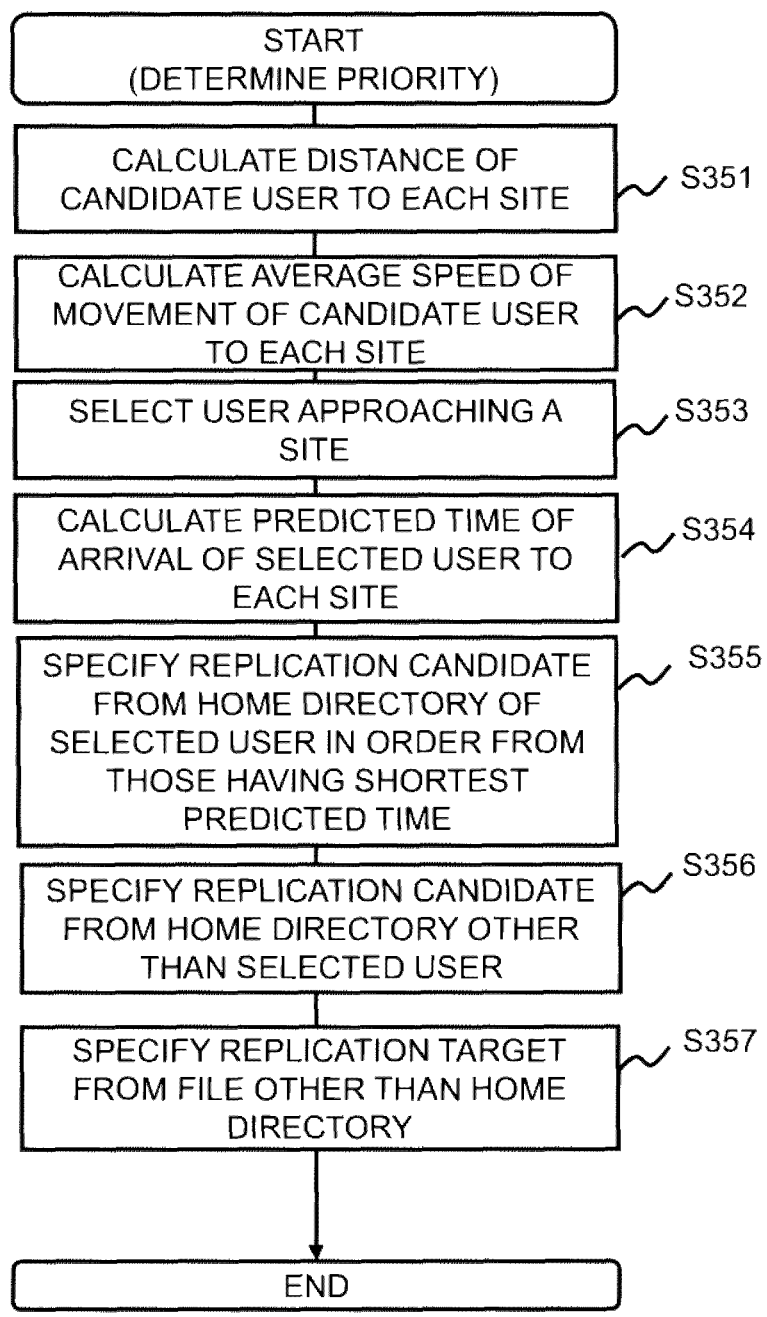
FIG. 13 is a flowchart of a replication priority determination process.

Next, the process for determining the replication priority will be described with reference to FIG. 13.

Figure 12:
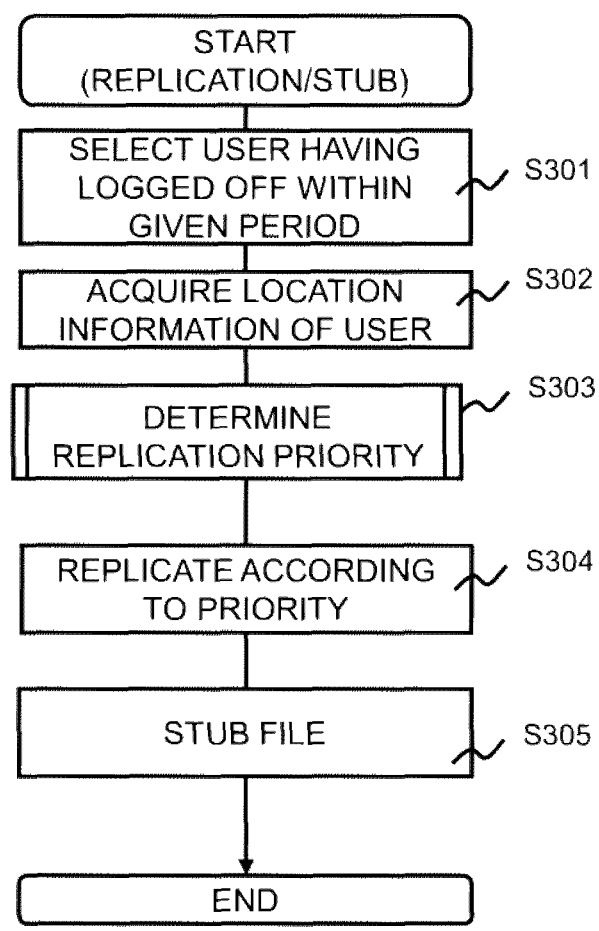
FIG. 12 is a flowchart of a replication/stubbing process.

In the process for determining the priority of replication, the replication target file is determined and the priority of replication thereof is determined based on the location information of the candidate user acquired in S302 of FIG. 12. At first, the local mover 37 extracts the latest location information (information having the latest registration time) from the location transition information of each candidate user acquired in S302. Based on the extracted latest location information and the Edge location information table 300, the local mover 37 calculates the distances from the respective candidate users to the respective sites (S351). The own site (the site in which the local file server 30 executing the process of S351) is not included in the above-mentioned respective sites.

The formula of Lambert-Andoyer disclosed in Japanese Patent Application Laid-Open Publication No. 2009-15181 can be adopted as an example of the method for calculating the distance between a user and respective sites using the longitude and latitude of the respective sites. However, the method for calculating the distance between the user and respective sites according to the present invention is not restricted to this method, and other methods can also be adopted.

Next, in S352, the local mover 37 uses the location transition information of the respective candidate users to calculate the average speed of movement of the user to the respective sites. Specifically, the displacement per unit time to each site can be calculated using multiple location information (for example, two location information). In S353, based on an average speed of movement of each user to each site calculated in S352, whether each user is approaching a certain site or moving away therefrom is determined, and only a user approaching any of the sites is chosen. However, the determination method performed in S353 is not restricted to the above-described method, and can use other methods. In the following description, the user chosen here is called a "chosen user".

In S354, the local mover 37 calculates the predicted time in which each user selected in S353 will arrive at each site. As one example of the method for calculating the predicted time, the distance to each site calculated in S351 should be divided by the average speed of movement to each site calculated in S352. However, the calculation of predicted time can also be performed using other calculation methods.

Figure 15:
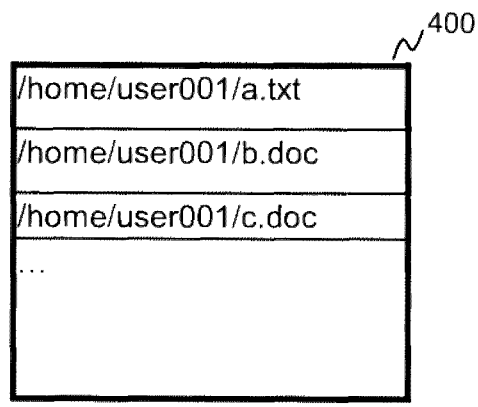
FIG. 15 is a view illustrating a configuration of a replication target list.

In S355 and the subsequent steps, a process to create the replication target list is performed. As illustrated in FIG. 15, a replication target list 400 is a list registering multiple path names of files set as replication targets. The path name located at the head of the list is the path name of the file having the highest replication priority, and thereafter, the path names of the files are additionally stored in this list based on the replication priority.

In S355, the local mover 37 sorts the user IDs of (multiple) chosen users in order from those having the shortest predicted arrival time to any of the sites. Then, the following processes are executed in the order of sorted user IDs:

(1) The file having a value "0" stored in a replication flag 220g is specified from the respective files under the home directory of the user specified by the user ID;

(2) The path name of the specified file is registered in the replication target list 400.

In S356, the local mover 37 executes an operation to select the file having "0" as the value of the replicated flag 220g as the replication target for the respective files under the home directory of users who are not the user set as the processing target in S355, and adds the path name of the selected file to the replication target list 400.

Further, in S357, the local mover 37 executes an operation to select the file having "0" as the value of the replication flag 220g for the respective files other than the home directory as the replication target, additionally registers the path name of the selected file to the replication target list 400, and ends the process.

Figure 14:
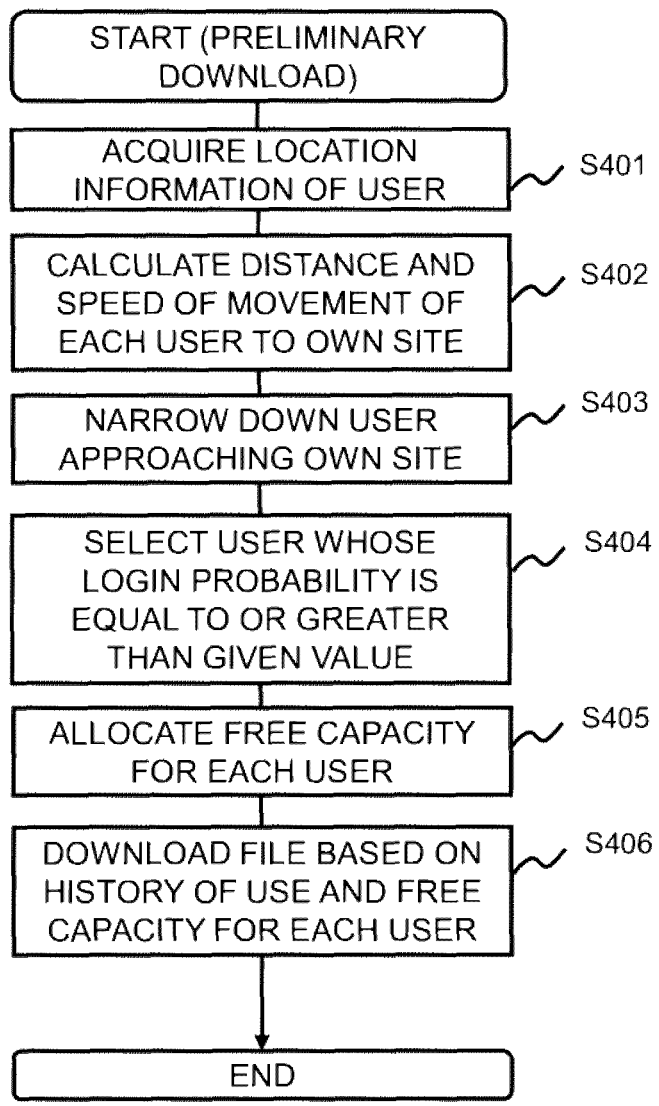
FIG. 14 is a flowchart of a preliminary download process.

Next, the flow of a preliminary download process executed by the local mover 37 according to the embodiment of the present invention will be described with reference to FIG. 14. Similar to the replication/stubbing process, the preliminary download process is executed periodically in the local file server 30.

At first, the local mover 37 acquires the location transition information of the respective users from the location information management program 128 (S401).

Next, the local mover 37 calculates the location of the respective users to its own site and the speed of movement of the respective users using the location transition information of the respective users acquired in S401 and the location information of its own site (registered in the Edge location information table 300) (S402). This process can be performed as a similar process of S351 and S352 of FIG. 13, or can be performed as a different process. The difference from S351 and S352 is that in S351 and S352, the distance to the respective sites and the speed of movement to the respective sites are calculated, whereas in 8402, only the distance to its own site and the speed of movement are calculated.

Next, in S403, the local mover 37 selects the user moving toward (approaching) its own site based on the location information and the speed of movement of the respective users calculated in S402. Here, similar to the method of S353 of FIG. 13, the users determined to be approaching its own site are selected. Further, similar to the method of S354 of FIG. 13, the predicted time of arrival of the users determined to be approaching its own site is calculated. Then, a user whose calculated predicted time is equal to or smaller than a given threshold is selected. The user selected here is called a "candidate user". As a different method, as mentioned in the description of the approach determination history table 330, it is possible to adopt a method where the user located at a distance smaller than the given threshold from its own site is determined as the candidate user. It is also possible to use these two methods to select the candidate user, in other words, a user approaching its own site and at a location at a distance smaller than a given threshold from the own site can be selected as the candidate user.

Further, in the present example, the information of the candidate user and the current time (time when the determination of S403 has been performed) is registered in the approach determination history table 330. Further, the login date and time table 310 is also referred to, so as to determine whether login exists or not for each entry registered in the approach determination history table 330, and stores 0 or 1 in the login flag 333.

Next, in S404, the local mover 37 calculates the login probability of the candidate user. The calculation of the login probability performs a process as the one described with reference to FIG. 10. That is, it refers to the approach determination history table 330, and calculates the following formula for each user:

(number of times of login of a user when he/she was determined to be approaching its own site)/ (number of times the user had been determined to be approaching its own site).

and registers the login probability of the candidate users to the login probability table 340. Then, it refers to the login probability table 340, and selects a user having a login probability equal to or greater than a given threshold from the candidate users. The user selected here is called a "selected user".

In S405, the local mover 37 determines the capacity of the storage area for storing the user file (file of the home directory) of the user selected in S405. It is possible to adopt a method for allocating the storage capacity to each user by dividing the free capacity of the local file server 30 by the number of selected users, but according to the local file server 30 of the present embodiment, the storage capacity to be allocated to the respective users is determined based on the login probability of the respective users calculated in S404. The storage capacity determined here will be the upper limit value of download of the user files. Greater storage area is allocated to users having a higher login probability, so that a greater amount of data of the user having a higher login probability is downloaded. In the following, the method for calculating the storage capacity to be allocated to the respective users will be described.

As a result of the process of S404, we will assume a case where N number of selected users (user 1, user 2, ... user N) exist. As a result of the process of S404, if the login probability of each user i ($1 \leq i \leq N$) approaching its own site is Pi, respectively, the local mover 37 calculates a weighting coefficient Wi of each user based on the following expression (1).

[Expression 1]

$$W_i = \frac{P_i}{\sum_{k=1}^{N} P_k} \quad (1)$$

When Wi has been calculated, the local mover 37 calculates a storage capacity Ci to be allocated to each user based on the following expression (2).

[Expression 2]

$$Ci = \text{free capacity of local file server } 30 \times Wi \quad (2)$$

(wherein the free capacity of the local file server 30 is the size of an unused area not having a file or a directory stored therein out of the storage areas of the LU 24 in which the local file server 30 stores files and directories using the file system 36).

Lastly, in S406, the local mover 37 determines the files being the download target and downloads the determined files from the user files of the respective selected users. The download of the files is performed in the following order of (a) to (d) for each user i. As described later, the download target files are determined from the files stored in the file use history table 350. In the present embodiment, the files (user files) within the home directory of user i are set as the download target out of the files recorded in the file use history table 350. However, as another embodiment, it is possible to adopt a method of including files other than the ones in his/her home directory to the download target when a history that user i has accessed these files remains in the file user history table 350.

(a) At first, the local mover 37 refers to the file use history table 350, and selects and downloads files having the access date and time 352 within a given time from the current time among the files in the home directory of user i. At this time, user files of the respective users i are downloaded in the range not exceeding Ci.

(b) If the total size of the files having been downloaded by the download process of (a) is not more than Ci, the local mover 37 downloads files in the home directory of user i that are registered in the file use history table 350 and that were not downloaded in (a). At this time, the user files of the respective users i are downloaded in the range not exceeding Ci.

(c) If the total size of the files downloaded by the download process of (a) and (b) is less than Ci, the local mover 37 acquires the file use history table 350 from the local file servers 30 of other sites. Then, the local mover 37 downloads the files whose access date and time 352 is within a given time from the current time from the files in the home directory of user i and registered in the file user history table 350 of other sites (however, the files downloaded by the download process of (a) and (b) are not included). At this time, user files of the respective users i are downloaded in the range not exceeding Ci.

(d) If the total size of the files downloaded by the download process of (a), (b) and (c) is less than Ci, the local mover 37 downloads files from the files in the home directory of user i that are not registered to the file use history table 350 of other sites and that were not downloaded in (c). At this time, the user files of the respective user i are downloaded in the range not exceeding Ci.

When download of S406 has been completed, the preliminary download proress is ended.

The file replication method and the file preliminary download method according to the information system of a preferred embodiment of the present invention has been described above. The local file server according to the present invention calculates the predicted time of arrival of respective users to other sites based on location information of the users. The user files of users having shorter predicted time of arrival at another site are replicated preferentially in the center file server. Since replication is performed in order from the files of users whose time for starting file access at a destination site is earlier, it becomes possible to prevent a case where the files updated at a certain site cannot be accessed at the destination site.

The local file server of the present invention determines whether a user is approaching its own site or not based on the location information of users, and performs preliminary download of the user files of the user determined to be approaching its own site preferentially from the center file server. Therefore, since the download of the user files to the local file server is completed at the point of time when the user arriving at the site performs access, the file access response time of the user can be shortened. Further, the time when the user is determined to be approaching its own site or the time of login of the user to the local file server are stored, the login probability of the user is calculated based thereon, and the amount of download of the user files is determined based on the login probability, so that a larger amount of user files of users having a higher possibility of accessing the local file server can be subjected to preliminary download.

Further, since the location information (such as latitude and longitude) periodically transmitted from a location information acquisition means such as a GPS equipped in a portable terminal that the user possesses is used as the user's location information, the calculation of predicted time of arrival of the user at a site and the determination on whether the user is approaching a site or not can be executed with high accuracy. As a result, the present system can determine the order of replication and the order of preliminary download with high accuracy.

The present embodiment has been described above, but this is a mere example for describing the present invention, and it is not intended to limit the scope of the present invention to the illustrated embodiments. In other words, the present invention can be realized in various other forms.

For example, according to the information system described above, the respective users log in to the client/host 40 located at each Edge 10 and accesses the file managed by the local file server 30 from the client/host 40, but the present invention is not restricted to such configuration. For example, it is possible to provide the functions of the client/host 40 to the local file server 30, so that the user can directly log in to the local file server 30 and access the files managed by the local file servers 30.

The configuration of the present invention is not restricted to the configuration where the storage subsystem 20 storing the write data of the local file servers 30 is disposed outside the local file servers 30. The present invention can adopt a configuration where the storage subsystem 20 is installed in the local file server 30. Even further, the present invention can also adopt a configuration where the center file server 120 also has the storage subsystem 110 installed, similar to the local file server 30.

REFERENCE SIGNS LIST

10 Edge
30 Local file server
100 Core
120 Center file server

The invention claimed is:

1. An information system comprising a data center having a center file server, and multiple sites each having a local file server storing user files of multiple users, wherein
    the local file server is configured to calculate a predicted arrival time of a user having logged off from the local file server to the multiple sites;
    based on the predicted arrival time, determine a priority of the user files to be replicated to the center file server; and
    replicate the user files to the center file server in accordance with the priority, wherein
    the local file server is configured to determine whether the user is approaching its own site based on the location information of its own site where the local file server is located and the location information of the user at multiple points of time; and
    download the user files of the user determined to be approaching its own site from the center file server, before the user logs in to the local file server, and wherein
    the local file server is configured to store multiple information of time when the user has been determined to be approaching its own site, associated with the user information, in an approach determination history table;
    store multiple information of time in which the user has logged into the local file server, associated with the user information, in a login date and time table;
    use the approach determination history table and the login date and time table to calculate a login probability in accordance with the following calculation:

(number of times of login to the local file server of the user determined to be approaching its own site)/(number of times that the user had been determined to be approaching its own site); and based on the login probability, calculate an upper limit value of download of data of the respective users.

2. The information system according to claim 1, wherein the local file server is configured to determine a user file having a high priority, in order from the user file of a user having the shortest predicted arrival time.

3. The information system according to claim 1, wherein after replication to the center file server has been performed, the local file server is configured to perform stubbing of a file having been replicated to the center file server.

4. The information system according to claim 1, wherein based on location information of the multiple sites and location information of the user at multiple points of time, the local file server is configured to calculate the predicted arrival time to the multiple sites.

5. The information system according to claim 4, wherein the location information of the user is a location information transmitted periodically from a mobile terminal possessed by the user.

6. The information system according to claim 5, wherein when the center file server receives a location information periodically transmitted from the mobile terminal possessed by the user, the center file server is configured to store the location information together with the user information and a reception time of the location information; and wherein
    the local file server is configured to acquire multiple sets of information of the location information and the reception time of the location information from the center file server.

7. The information system according to claim 1, wherein the local file server is configured to calculate a predicted arrival time of the respective users to its own site based on a location information of its own site and a location information of the respective users at the multiple points of time, and
    determine that a user whose predicted arrival time is equal to or below a given threshold is approaching its own site.

* * * * *